(12) United States Patent
Markman

(10) Patent No.: US 8,761,070 B2
(45) Date of Patent: Jun. 24, 2014

(54) METHOD AND APPARATUS FOR ENCODING A SIGNAL

(75) Inventor: Ivonete Markman, Carmel, IN (US)

(73) Assignee: Thomson Licensing, Issy-Les Moulineaux (FR)

( * ) Notice: Subject to any disclaimer, the term of this patent is extended or adjusted under 35 U.S.C. 154(b) by 284 days.

(21) Appl. No.: 13/263,114

(22) PCT Filed: Apr. 15, 2010

(86) PCT No.: PCT/US2010/031182
§ 371 (c)(1),
(2), (4) Date: Oct. 6, 2011

(87) PCT Pub. No.: WO2010/120993
PCT Pub. Date: Oct. 21, 2010

(65) Prior Publication Data
US 2012/0020276 A1 Jan. 26, 2012

Related U.S. Application Data

(60) Provisional application No. 61/169,875, filed on Apr. 16, 2009.

(51) Int. Cl.
*H04H 20/71* (2008.01)
*H04L 1/00* (2006.01)

(52) U.S. Cl.
CPC ........................... *H04L 1/004* (2013.01)
USPC .......................................................... 370/312

(58) Field of Classification Search
CPC .................... H04N 21/4382; H04N 21/41407;
H04N 21/2383; H04N 21/4345; H04N 21/235;
H04N 21/435; H04N 21/64322; H04N
21/4425; H04N 21/23614; H04N 21/2362;
H04N 21/2381; H04N 21/4381; H04H 20/57;
H04H 20/30; H04H 20/55; H04H 20/95;
H04L 1/006; H04L 1/0065; H04L 1/0071;
H04L 1/0057; H04L 1/007; H04L 1/0041;
H04L 1/0045; H03M 13/1515; H03M
13/2909; H03M 13/356; H03M 13/09; H03M
13/15; H03M 13/271; H03M 13/2915; H03M
13/293; H03M 13/2966; H03M 13/2972;
H03M 13/2936; H03M 13/2945; H04W 4/06;
H04W 72/005
USPC ......................... 370/312, 328–330, 339–345;
375/240.26–240.28, 146–147,
375/260–265; 714/2–7, 48–54, 746–758,
714/781–784, 799–805
See application file for complete search history.

(56) References Cited

U.S. PATENT DOCUMENTS 8,149,744 B2 * 4/2012 Song et al. ..................... 370/310
8,307,400 B2 * 11/2012 Song et al. ....................... 725/62

(Continued)

FOREIGN PATENT DOCUMENTS

JP          62110331       5/1987
WO     WO 2007/100186   9/2007

OTHER PUBLICATIONS

Jeng J.H ; Truong T. K.; "On decoding of both errors and erasures of a Reed-Solomon code using an inverse-free Berlekamp-Massey algorithm." Communications, IEEE Transactions on. vol. 47, Issue: 10. Digital Object Identifier: 10.1109/26.795817. Publication Year: 1999, pp. 1488-1494.*

(Continued)

*Primary Examiner* — Thai Hoang
(74) *Attorney, Agent, or Firm* — Robert D. Shedd; Vincent E. Duffy; Michael A. Pugel

(57) ABSTRACT

Communication systems for broadcasting data often include the ability to combine and transmit more than one type or format of data. A method includes receiving a packet of data, determining a location for a parity byte, the location based on a characteristic of the packet of data, decoding the data to determine a value for the parity byte, and outputting a coded packet of data. An apparatus includes a first signal processor for receiving a first data signal and a second data signal, combining the signals, and creating a signal identifying the signals. The apparatus also includes a second signal processor for encoding the combined signal using a decoding algorithm to generate Reed-Solomon parity bytes in locations within the combined signal based on the identifying signal.

15 Claims, 9 Drawing Sheets

(56) References Cited

U.S. PATENT DOCUMENTS

| | | | |
|---|---|---|---|
| 2009/0067548 A1 | 3/2009 | Song et al. | |
| 2010/0061491 A1* | 3/2010 | Choi et al. | 375/341 |
| 2010/0232550 A1* | 9/2010 | Lee et al. | 375/341 |
| 2010/0306618 A1* | 12/2010 | Kim et al. | 714/755 |

OTHER PUBLICATIONS

Truong, T.K. ; Jeng, J.H. ; Cheng, T.C.; "A new decoding algorithm for correcting both erasures and errors of Reed-Solomon codes." Communications, IEEE Transactions on. vol. 51, Issue: 3. Digital Object Identifier: 10.1109/TCOMM.2003.809764. Publication Year: 2003, pp. 381-388.*

Eui Jun Park, et al. "Supplementary Reference Sequence VSB System;" Consumer Electronics, 2007 ICCE 2007 Conference on IEEE, PI, Jan. 1, 2007. ICCE 2007 Digest of Technical Papers. International Conference on, IEEE, PI, Jan. 1, 2007 pp. 1-2 XP031071441.

Search Report dtd Jul. 29, 2010.

* cited by examiner

METHOD AND APPARATUS FOR ENCODING A SIGNAL

CROSS REFERENCE TO RELATED APPLICATIONS

This application claims the benefit under 35 U.S.C. §365 of International Application PCT/US2010/031182 filed Apr. 15, 2010, published in accordance with PCT article 21(2) on Oct. 21, 2010, which claims the benefit under 35 U.S.C. §119 of provisional application 61/169,875 filed in the United States on Apr. 16, 2009.

FIELD OF THE INVENTION

The present disclosure relates generally to the operation of a signal transmission system and more specifically to the encoding of a signal transmitted as part of a broadcast transmission system.

BACKGROUND OF THE INVENTION

This section is intended to introduce the reader to various aspects of art, which may be related to various aspects of the present invention that are described below. This discussion is believed to be helpful in providing the reader with background information to facilitate a better understanding of the various aspects of the present invention. Accordingly, it should be understood that these statements are to be read in this light, and not as admissions of prior art.

Television broadcast systems throughout the world have migrated from the delivery of analog audio and video signals to modern digital communications systems. For example, in the United States, the Advanced Television Standards Committee (ATSC) has developed a standard called "ATSC Standard: Digital Television Standard A/53" (the A/53 standard). The A53 standard defines how data for digital television broadcasts should be encoded and decoded. In addition, the U.S. Federal Communications Commission (FCC) has allocated portions of the electromagnetic spectrum for television broadcasts. The FCC assigns a contiguous 6 Megahertz (MHz) channel within the allocated portion to a broadcaster for transmission of terrestrial (i.e., not cable or satellite) digital television broadcasts. Each 6 MHz channel has a channel capacity of approximately 19 Megabits (Mb)/second based on the encoding and modulation format in the A53 standard. Furthermore, the FCC has mandated that transmissions of terrestrial digital television data through the 6 MHz channel must comply with the N53 standard.

Digital broadcast signal transmission standards, such as the A/53 standard, define how source data (e.g., digital audio and video data) should be processed and modulated into a signal that is transmitted through the channel. The processing adds redundant information to the source data so that a receiver that receives the signal from the channel may recover the source data, even if the channel adds noise and multi-path interference to the transmitted signal. The redundant information added to the source data reduces the effective data rate at which the source data is transmitted but increases the potential for successful recovery of the source data from the transmitted signal.

The A53 standard development process was focused on high definition television (HDTV) and fixed reception. The system was designed to maximize video bit rate for the large high resolution television screens that were already beginning to enter the market. Transmissions broadcast under the ATSC A/53 standard, or legacy encoding and transmission standard, present difficulties for mobile receivers.

Recognizing this fact, in 2007, the ATSC announced the launch of a process to develop a standard that would enable broadcasters to deliver television content and data to mobile and handheld devices via their digital broadcast signal, commonly known as the ATSC M/H or A/153 standard. Changes to the legacy transmission standard include an additional encoding scheme to introduce further data redundancy. The additional encoding has been adapted to better perform with advanced receivers in mobile, handheld and pedestrian devices while still remaining backward compatible with the legacy A/53 standard. The proposed changes also allow operation of existing ATSC services in the same radio frequency (RF) channel without an adverse impact on existing receiving equipment.

In transmitters that comply with the mobile ATSC standard, referred to as ATSC M/H, it is primarily necessary to perform Reed-Solomon (RS) encoding according to conditions related to the ATSC M/H signal. Existing legacy RS encoders do not provide the proper processing of the ATSC M/H signal. In addition, straightforward modifications of the existing legacy RS encoder may not produce an efficient implementation, resulting in poor operational efficiency and increased costs. It is desirable to develop an efficient RS encoder based on the modifications implied by the operating conditions related to ATSC M/H signal encoding and broadcasting.

SUMMARY OF THE INVENTION

In accordance with an aspect of the present embodiments, a method for encoding a signal is disclosed including the steps of receiving a packet of data, determining a location for a parity byte in the packet of data, the location based on a characteristic of the packet of data, encoding the packet of data using a decoding process to determine a value for the parity byte, and outputting the encoded packet of data including the packet of data and the decoded parity byte.

In accordance with another aspect of the present embodiments, an apparatus is disclosed including a first signal processor that receives a first data signal and a second data signal, the first signal processor combining the first data signal and the second data signal and creating a signal identifying the first data signal and second data signal in the combined signal, and a second signal processor coupled to the first signal processor, the second signal processor Reed-Solomon encoding the combined signal using a decoding algorithm with erasures to generate Reed-Solomon parity bytes in locations within the combined signal based on the identifying signal from the first signal processor.

Figure 1:
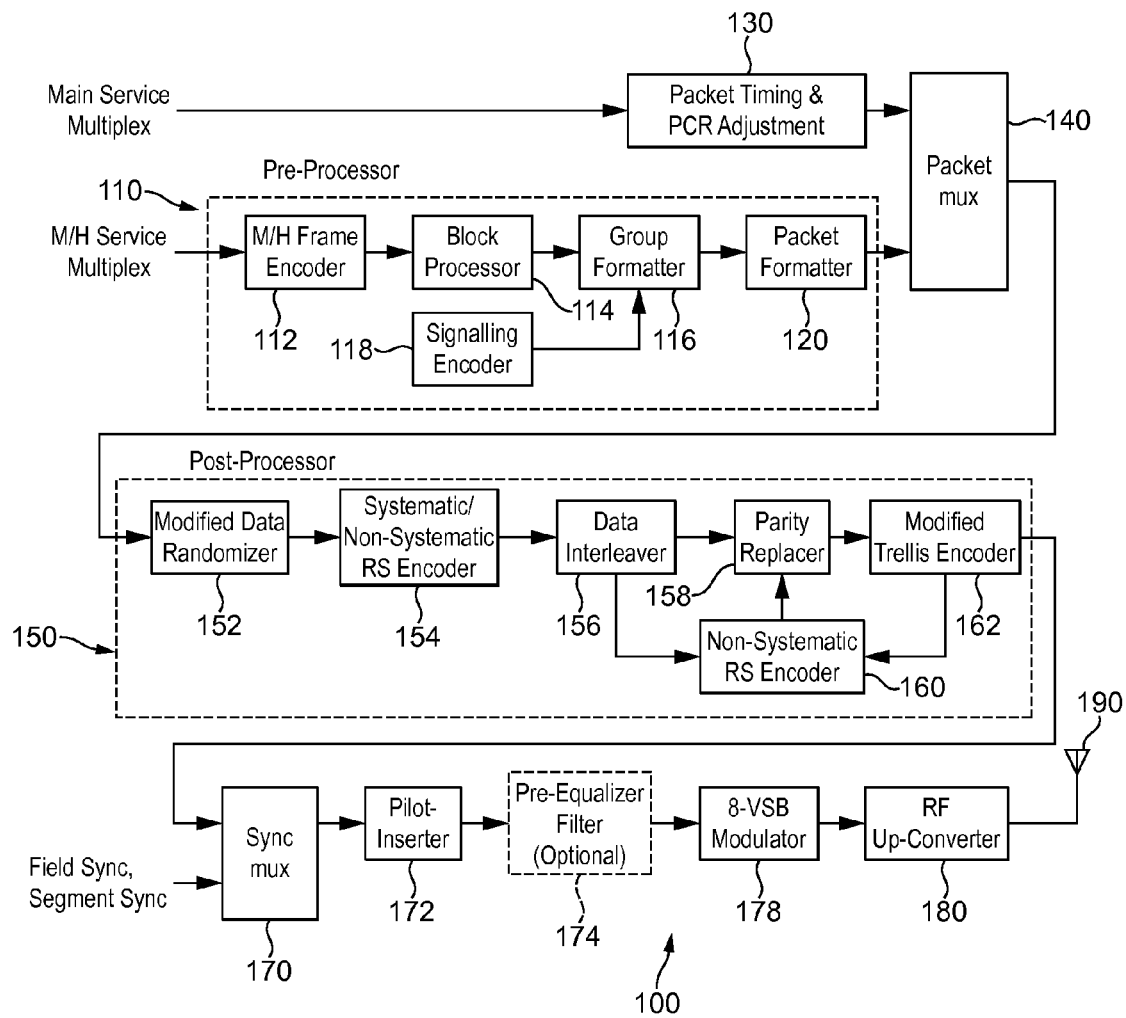
FIG. 1 is a block diagram of a signal transmission system of the present disclosure.

The characteristics and advantages of the present disclosure may become more apparent from the following description, given by way of example.

DETAILED DESCRIPTION

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort would nevertheless be a routine undertaking of design, fabrication, and manufacture for those of ordinary skill having the benefit of this disclosure.

The following describes a system relating to television broadcast signals, and more particularly to broadcast signals as defined for use in the United States. The embodiments described may generally be used in a signal transmitting facility and at a user's premises. Examples of the user premises devices used include, but are not limited to, settop boxes, laptop or desktop computers, monitors, and televisions. Other systems utilized to transmit and receive other types of signals may include similar structures and processes. Those of ordinary skill in the art will appreciate that the embodiments of the circuits and processes described herein are merely one set of potential embodiments. It is important to note that signals compliant with broadcast and wireless standards other than the A/53 and A/153 standard, in general, may be transmitted and received in a manner similar to those described here. As such, in alternate embodiments, the components of the system may be rearranged or omitted, or additional components may be added. For example, with minor modifications, the system described may be configured for use in the digital video broadcast-terrestrial (DVB-T) broadcast services used elsewhere in the world.

The embodiments described below are primarily related to transmission of signals, and in particular to the transmission of broadcast signals encoded using the legacy ATSC broadcast signal and including an ATSC M/H broadcast signal. Certain aspects of the embodiments including, but not limited to, certain control signals and power supply connections have not been described or shown in the figures but may easily be ascertained by a skilled artisan. It should be noted that the embodiments may be implemented using hardware, software, or any combination of both, including the use of a microprocessor and program code or custom integrated circuits. It should also be noted that many of the embodiments involve iterative operation and connection between the various elements of the embodiment. Alternative embodiments may be possible using pipelining architectures employing repeated identical elements, connected in series, in place of, or in addition to, the iteration operation embodiments described herein.

The embodiments describe an architecture for an RS encoder and a method for RS encoding used in conjunction with ATSC M/H encoding and signal transmission. The embodiments describe the encoding implementing an RS decoder with erasures and further recognize aspects of the M/H group structure and signal characteristics to simplify its design.

Turning now to FIG. 1, a block diagram of a signal transmission system 100 according to aspects of the present disclosure is shown. Transmission system 100 encodes and transmits signals according to the ATSC M/H or A/153 broadcast standard. The transmission system 100 receives two sets of input streams, the MPEG transport stream (TS) packets of the main service data, and the M/H service data. Main service data is provided to packet timing and adjustment block 130. The M/H service data stream is provided to pre-processor 110. The outputs of packet timing and adjustment block 130 and pre-processor 110 are connected to packet mux 140. Packet mux 140 is connected to post-processor 150. The output of post-processor 150 is connected to sync mux 170. A field sync and segment sync signal are both provided as an input to sync mux 170. Sync mux 170 connects to pilot inserter 172. Pilot inserter 172 connects to pre-equalizer filter 174. The pre-equalizer filter 174 connects to 8-level vestigial sideband (8-VSB) modulator 178. The 8-VSB modulator 178 connects to upconverter 180. Upconverter 180 connects to antenna 190. Antenna 190 transmits the combined and processed streams, the main service data and M/H service data, as one or more ATSC A153 broadcast signals.

Pre-processor 110 further includes several blocks associated with encoding the M/H service data stream. The input signal is provided to M/H frame encoder 112. The M/H frame encoder is connected to block processor 114. The block processor 114 is connected to the group formatter 116. A signaling encoder 118 also provides an input to group formatter 116. The group formatter is connected to the packet formatter 120. Packet formatter provides the output signal for the pre-processor 110.

Post-processor 150 further includes several blocks associated with encoding the combined data stream. The input signal is provided to modified data randomizer 152. The data randomizer 152 is connected to the systematic/non-systematic RS encoder 154. The systematic/non-systematic RS encoder 154 is connected to data interleaver 156. The data interleaver 156 is connected to parity replacer 158. The data interleaver 156 is also connected to a non-systematic RS encoder 160. The parity replacer 158 is connected to the modified trellis encoder 162. One of the outputs of the modified trellis encoder 162 is connected as a feedback input to the non-systematic RS encoder 160. The non-systematic RS encoder 160 is connected as a second input to parity replacer 158. The modified trellis encoder 162 also provides the output signal for the post-processor 150. It is important to note that many of the blocks in post-processor 150 perform functions similar to those functions found in a signal encoding system for ATSC A53 broadcast signals. The functions of some of the blocks have been modified or adapted to incorporate changes due to the presence of the additional ATSC M/H service data stream.

At a high level, the function of the transmission system 100 is to combine the two types of streams, the main service data and the M/H service data, into one stream of MPEG transport stream packets and process and modulate them into the normal ATSC trellis-coded 8-VSB signal according to the A53 standard. For compatibility with legacy 8-VSB receivers, the M/H service data is encapsulated in special MPEG-2 transport stream packets, designated as M/H Encapsulation (MHE) packets, in pre-processor 110. The pre-processor 110 can accommodate encapsulated service data that is in any desired format. For example, services carried in MPEG transport streams such as like MPEG-2 video/audio, MPEG-4 video/audio, other data, or services carried by IP packets may be processed.

Pre-processor 110 rearranges the M/H service data into an M/H data structure to enhance the robustness of the M/H service data. Forward error correction is performed in MH frame encoder 112 and block processor 114. Training sequences are added by signaling encoder 118 and group formatter 116. Packet formatter 120 subsequently encapsulates the processed enhanced data into MHE transport stream packets and formats the MHE packets as a Group of 118 consecutive packets of 207 bytes (or segments) to be inserted in the main service data stream.

The main service multiplex data is provided to the packet timing and adjustment block 130. Packet timing and adjustment block 130 adjusts the main service multiplex data to compensate for temporal displacements at the combining point so that the emitted signal complies with the MPEG and ATSC standards to protect legacy receivers. Time-division multiplexing of main and M/H data introduces changes to the time of emission of the main service stream packets compared to the timing that would occur with no M/H stream present. The temporally adjusted main service multiplex data from packet timing and adjustment block 130 and the processed MH service data from the pre-processor 110 are multiplexed, or combined, together in packet mux 140. At the packet mux 140, each M/H Group is inserted in an M/H Slot, consisting of 156 data packets, or half the size of an ATSC data field. M/H Slots may or may not contain M/H Groups. If an M/H Group is inserted in a particular Slot, then 118 packets are M/H packets and 38 packets are main service data packets. If no M/H Group is inserted in a Slot, then all 156 packets are main service data packets. The allocation of M/H Groups to M/H Slots shall be a function of the relative rates between the M/H data and the main service data.

The combined data stream is provided to post-processor 150. Post-processor 150 further encodes and processes the combined data stream, and is capable of recognizing, separating, and separately processing and encoding the main service data portion and the MH service data portion of the combined data stream. Post-processor 150 processes and encodes the main service data using the 8-VSB encoding based on the A53 standard. The encoding includes data randomizing in modified data randomizer 152, RS encoding in systematic/non-systematic RS encoder 154, data interleaving in data interleaving 156, and trellis encoding in modified trellis encoder 162.

Post-processor 150 also manipulates the pre-processed M/H service data in the combined stream to ensure compatibility with ATSC 8-VSB receivers. The M/H service data in the combined stream is processed differently from the main service data in post-processor 150. The M/H service data bypasses the modified data randomizer 152 and is not randomized. The pre-processed M/H service data is encoded as non-systematic data in systematic/non-systematic RS encoder 154 and interleaved, as a block of data containing 52 bytes, in data interleaver 156. Data interleaver 156 corresponds to the A/53 ATSC convolutional interleaver and equally applies to M/H and main service data. Additional operations are also performed on the pre-processed M/H service data in order to properly initialize the trellis encoder memories at the start of each training sequence included in the pre-processed M/H service data. Operation of the systematic/non-systematic RS encoder 154 will be described in further detail below.

A systematic/non-systematic RS encoder 154 is used to perform the RS encoding process of the (N, K, t)=(207, 187, 10) code at the data output of modified randomizer 152. The systematic/non-systematic RS encoder 154 is a modified version of a standard ATSC RS encoder for the same RS code but reflects the modifications implied by the MH group data format table included as part of the A153 standard. The non-systematic RS encoding of the MH service data allows the insertion of the regularly spaced long training sequences without disrupting reception by legacy receivers.

As described in the ATSC M/H standard A153, the systematic/non-systematic RS encoder shall perform an RS encoding process with a (N,K,t)=(207, 187, 10) code on the data output by the data randomizer, which will have been randomized or bypassed by the data randomizer. The RS parity generator polynomial and the primitive field generator are identical to those of the legacy ATSC 8-VSB system.

In operation of systematic/non-systematic RS encoder 154, if the inputted data corresponds to a main service data packet, the RS encoder shall perform the same systematic RS encoding process as in the legacy ATSC 8-VSB system, adding 20 bytes of RS FEC parity data at the end of each set of 187 information-byte packets, therefore creating a 207-coded byte packet or segment. However, if the inputted data corresponds to an M/H service data packet, the RS encoder shall perform a non-systematic RS encoding process.

Modified trellis Encoder 162 operates in a manner similar to a conventional trellis encoder used in the ATSC A/53 broadcast standard. In operation, 12 interleaved rate 2/3 trellis encoders with differential pre-coding perform the encoding. However, the inclusion the M/H data creates for the additional need to initialize the encoder memories just prior to each M/H training sequence, for the purpose of obtaining known training sequences used for receiving the ATSC M/H signal. In addition, the RS parity data calculated prior to the trellis initialization for the M/H signal will now contains errors prior to transmission. Hence, Trellis Encoder 162 supplies the changed initialization byte to the Non-Systematic RS Encoder 160. Non-systematic RS encoder 160, together with pre-interleaved data and control signals provided by Data interleaver 156, calculates the new parity bytes to replace the erroneous parity bytes due to trellis initialization. These calculated parity bytes are provided to parity replacer 158 in order replace the original ones computed by systematic/non-systematic RS encoder and provided back to modified trellis Encoder 162.

The final output of modified trellis encoder 162 is provided to sync mux 170 and the remaining blocks in FIG. 1, These remaining blocks in FIG. 1 are identical to blocks used in a signal transmission system for broadcasting a signal using the ATSC A/53 standard. Sync mux 170 adds the ATSC A/53 synchronization, known as field and segment synchronization signals, to the data stream. Pilot inserter 172 inserts a small in-phase pilot to the data signal with the same frequency as the suppressed-carrier frequency. The optional pre-equalizer filter 174 filters the signal to compensate in advance for known system distortions and facilitate the reception. The 8-VSB modulator 178 modulates the 8-level trellis encoded composite data signal (including pilot and sync) in accordance with the A/53 specification, based on Vestigial Sideband modulation and a linear phase raised cosine Nyquist filter response in the concatenated transmitter and receiver and an intermediate frequency (IF) frequency of 44 MHz. Finally RF up-Converter 180 up-converts the 8-VSB signal to the proper RF channel frequency to be broadcast via antenna 190.

It is important to note that it may be possible to combine the systematic/non-systematic encoder 154 and non-systematic encoder 160 and eliminate the separate encoding blocks. In one embodiment, non-systematic RS encoder 160 may be replaced by a memory and a processing block that multiplies the trellis encoded data by a stored weight value and replaces the data bytes in the MH service data portion of the combined data stream in order to initialize the trellis encoded data stream during the MH service data portion.

Figure 2:
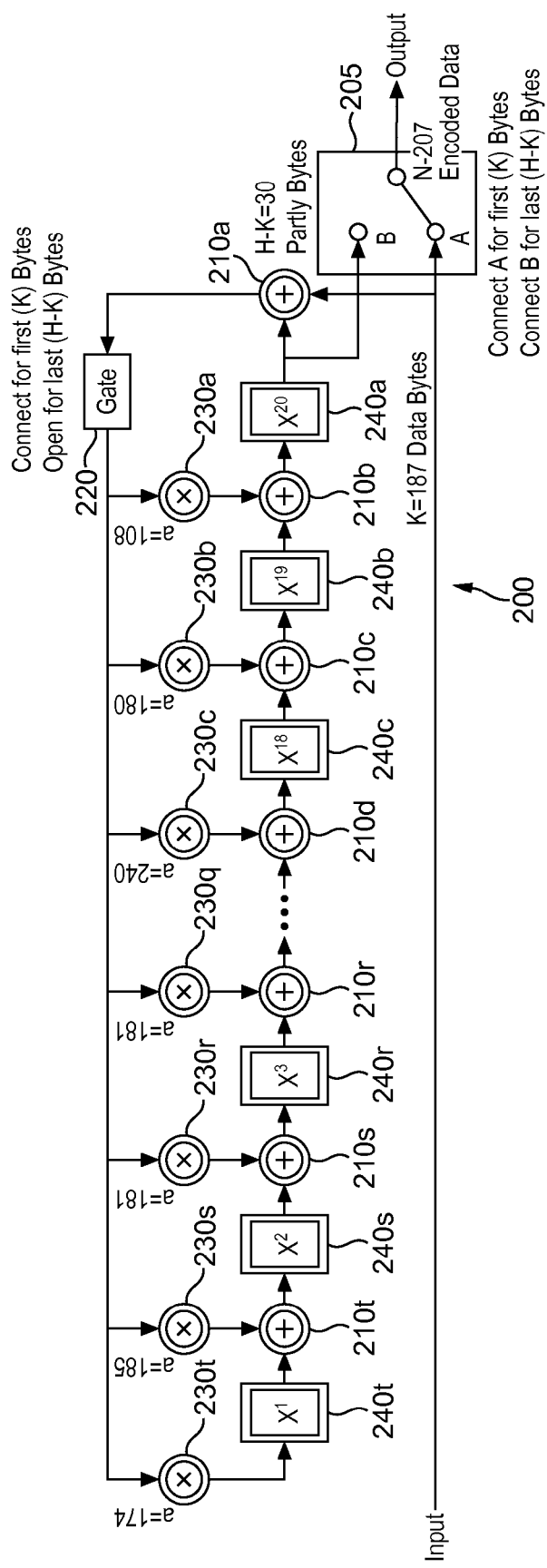
FIG. 2 is a block diagram of an embodiment of a Reed Solomon encoder circuit of the present disclosure.

Turning to FIG. 2, a block diagram illustrating an embodiment of a RS encoder 200 according to aspects of the present disclosure is shown. RS encoder 200 represents an architecture for a systematic RS encoder. RS encoder 200 may be used as part of the systematic/non-systematic RS encoder 154 described in FIG. 1. Since the parity can be created by a generator polynomial, RS encoder 200 can be designed as a linear feedback shift register (LFSR), with multiplications and additions performed on the Galois Field GF(256). In a general systematic RS encoder, the K information symbols are inputted into the LFSR, as well as sent to the output through a switch. After the K information symbols are output, the switch is then connected to the LSFR to output the N−K RS parity symbols.

In RS encoder 200, an input signal consisting of 187 data bytes is provided to one input of switch 205. The output of switch 205 is the output of RS encoder 200. The input signal is also connected to summer 210a as part of the LSFR. The output of the summer 210a connects to gate 220. The output of gate 220 connects to each of a series of multipliers 230a-230t. The output of multiplier 230t connects directly to delay block 240t while the outputs of multipliers 230a-230s connect to one input of summers 230b-230t. The outputs of the summers 230b-230t each connect in series to delay blocks 240a-240t. The outputs of delay blocks 240a-240t each connect in series to the other inputs of summers 230a-230t to form the LSFR. The output of delay block 240t also connects to the other input of switch 205 to provide 20 parity data bytes as an output signal.

A non-binary block code consists of a set of fixed-length code words in which the elements of a code word are selected from an alphabet of q symbols. Usually, $q=2^m$ so that m information bits are mapped into one of the q symbols and the alphabet is a Galois Field GF(q), that is, a finite field of q elements $\{0, 1, \alpha, \ldots \alpha^{q-2}\}$, where $\alpha$ is the primitive element of the field. In addition, the primitive element is a root of a primitive polynomial P(X) and $\alpha^{q-1}=1$.

Reed-Solomon (RS) codes are some of the most important for practical applications among the various types of non-binary linear block codes. They are cyclic Bose Chaudhuri Hocquenghem (BCH) codes for which the parameters N−K=2*t, where N is the code word length, K is the number of information symbols and t is the number of correctable errors. For RS codes, their generator polynomial is defined by:

$$G(X)=(X-\alpha)*(X-\alpha^2)*\ldots*(X-\alpha^{2t}) \quad (1)$$

Equation 1 is implemented by the series of summers 210a-210t, multipliers 230a-230t, and delay blocks 240a-240t shown as the LSFR portion of RS encoder 200. Summers 210a-210t are implemented as a modulo 256 addition function for two bytes, or field elements. Similarly, multipliers 230a-230t are implemented as a modulo 256 multiplication function for two bytes, or field elements. Delay blocks 240a-240t operate to store and retrieve the bytes, or field elements based on a processing clock, such as a symbol or data clock. Gate 220 operates in conjunction with switch 205 to disconnect the output of summer 230a from the inputs of multipliers 230a-230t when the parity bytes are being output through switch 205. It is important to note that the most basic definition sets represent $N=q-1=2^m-1$, as described above, but RS codes can be shortened, such that N is a smaller number.

As described above, the systematic RS code used in the ATSC standard is the code (N,K,t)=(207, 187, 10) code, where each RS symbol is a byte (m=8, q=256) that is a member of the GF(256). A total RS block size of N=207 bytes is transmitted per data segment, with the N−K=20 RS parity bytes sent at the end of the data segment. This implies that the ATSC RS code is a systematic code, that is, a copy of the K information symbols is contained in the code word, most commonly in the beginning of the code word. In creating bytes from the serial bit stream, the MSB is the first serial bit.

The two main reasons for the importance of RS codes and their widespread use are their good distance properties and the existence of efficient algebraic decoding algorithms which make it possible to implement relatively long codes. This has resulted in the utilization of RS codes for their burst error correcting capability, often concatenated with a convolutional code through an interleaver, such as data interleaver 156 and modified trellis encoder 162 described in FIG. 1.

Figure 3:
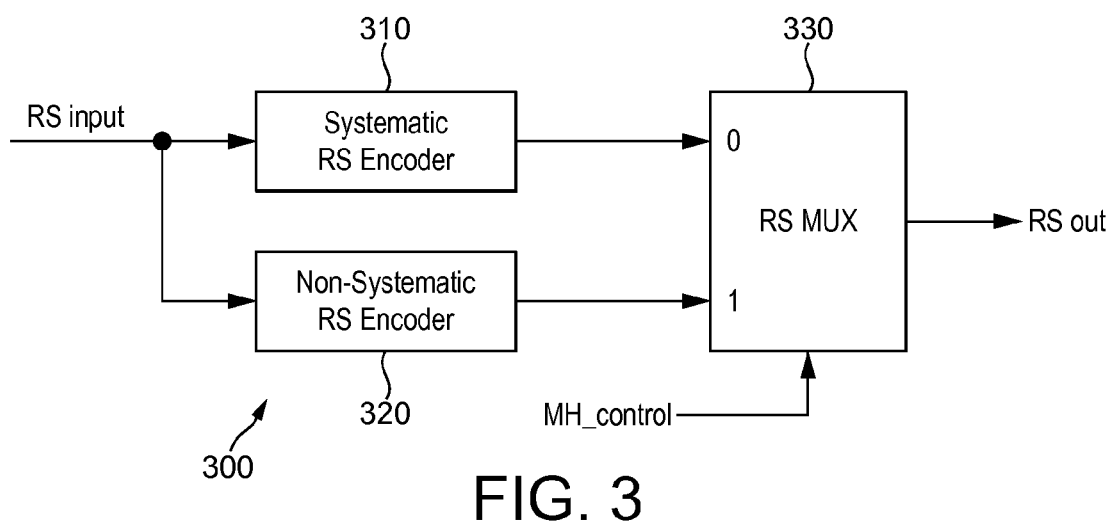
FIG. 3 is a block diagram of another embodiment of a signal encoder of the present disclosure.

Turning to FIG. 3, a block diagram illustrating an embodiment of a signal encoder 300 according to principles of the present disclosure is shown. Signal encoder 300 encodes both the main service data portion and MH service data portion of the combined data similar to the operation of systematic/non-systematic RS encoder 154 shown in FIG. 1.

In signal encoder 300, the input signal from a previous processing block, such as modified data randomizer 152 in FIG. 1, is provided to systematic RS encoder 310 and also to non-systematic encoder 320. Both the systematic RS encoder 310 and non-systematic encoder 320 are connected to RS mux 330. A control signal, MH_control, is also provided to RS mux 330. RS mux 330 outputs an encoded signal that may be provided to a further processing block, such as data interleaver 156.

In operation, signal encoder 300 encodes the main service data in systematic RS encoder 310 and the MH service data in non-systematic RS encoder 320 and chooses which data in RS mux 330 to output based on the control information provided as MH_control. The MH_control signal may be fed from the pre-processor to the post-processor as an indicator of whether the data is main service data (legacy ATSC data) or MH service data (M/H data).

When the MH_control signal is a logic value '0', the signal encoder 300 operates in systematic encoding mode. During systematic mode, the incoming signal, containing main service data, passes through systematic RS encoder 310 Systematic RS encoder 310 adds 20 parity bytes to the end of the packet of 207 bytes. It is important to note that operation of systematic RS encoder 310 may operate in a manner similar to the operation of RS encoder 200 described in FIG. 2.

When the MH_control signal is a logic value '1', the signal encoder 300 operates in non-systematic encoding mode. During the non-systematic mode, the incoming signal, containing MH service data, passes through non-systematic RS encoder 320. In non-systematic RS encoder 320, the parity bytes will be added to pre-determined locations for each of the 118 packets, equivalent to segments in the ATSC standard, of the group. The non-systematic RS encoder still has the same generator polynomial and primitive generator as the systematic RS encoder 310 and generates and emulates a valid legacy ATSC code word for legacy receivers, in order to prevent inherent reception errors in the receivers.

Figure 4A:
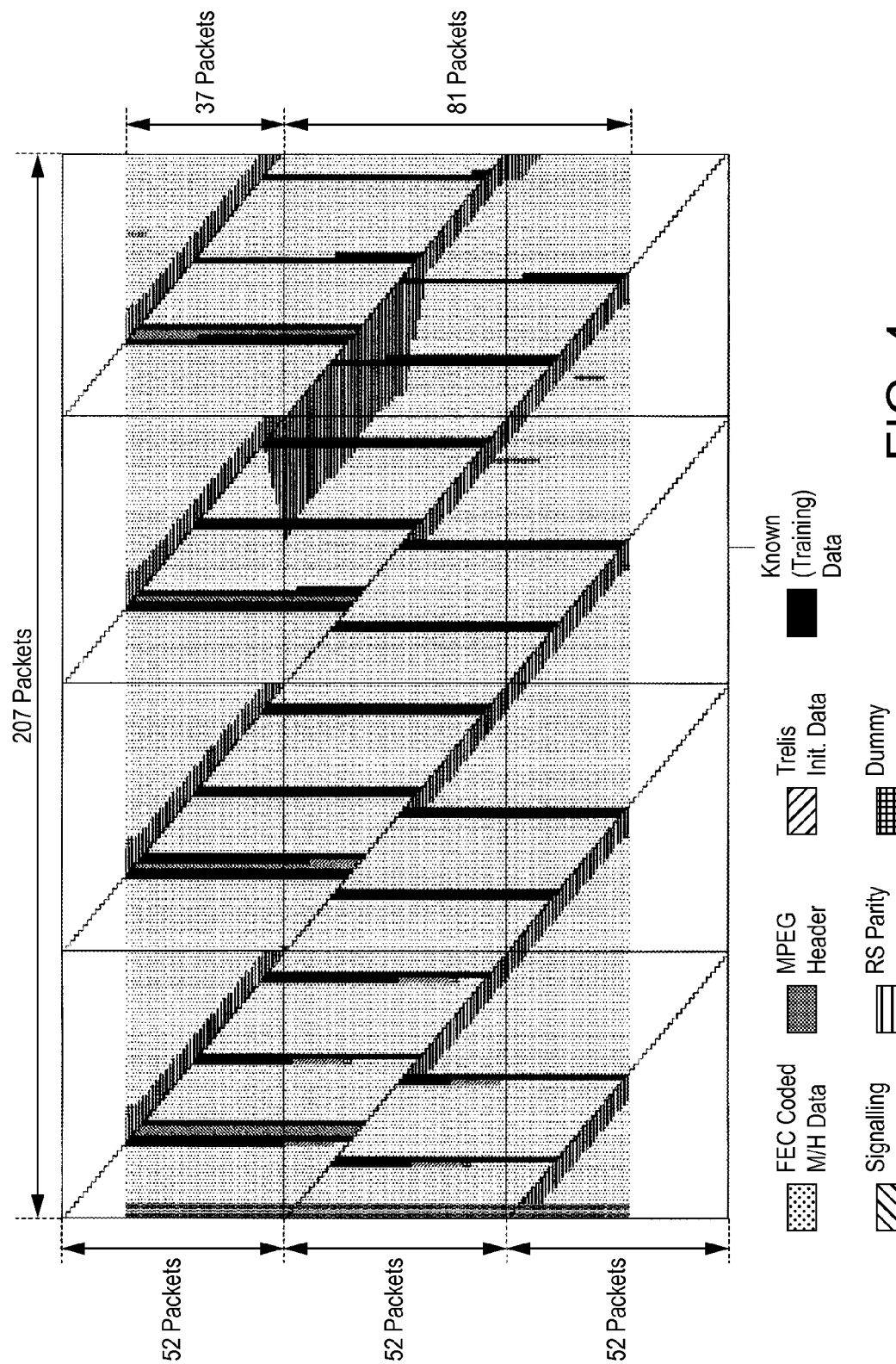
FIG. 4a is an exemplary transmission signal diagram illustrating the parity byte locations for the data packets according to the present disclosure.
Figure 4B:
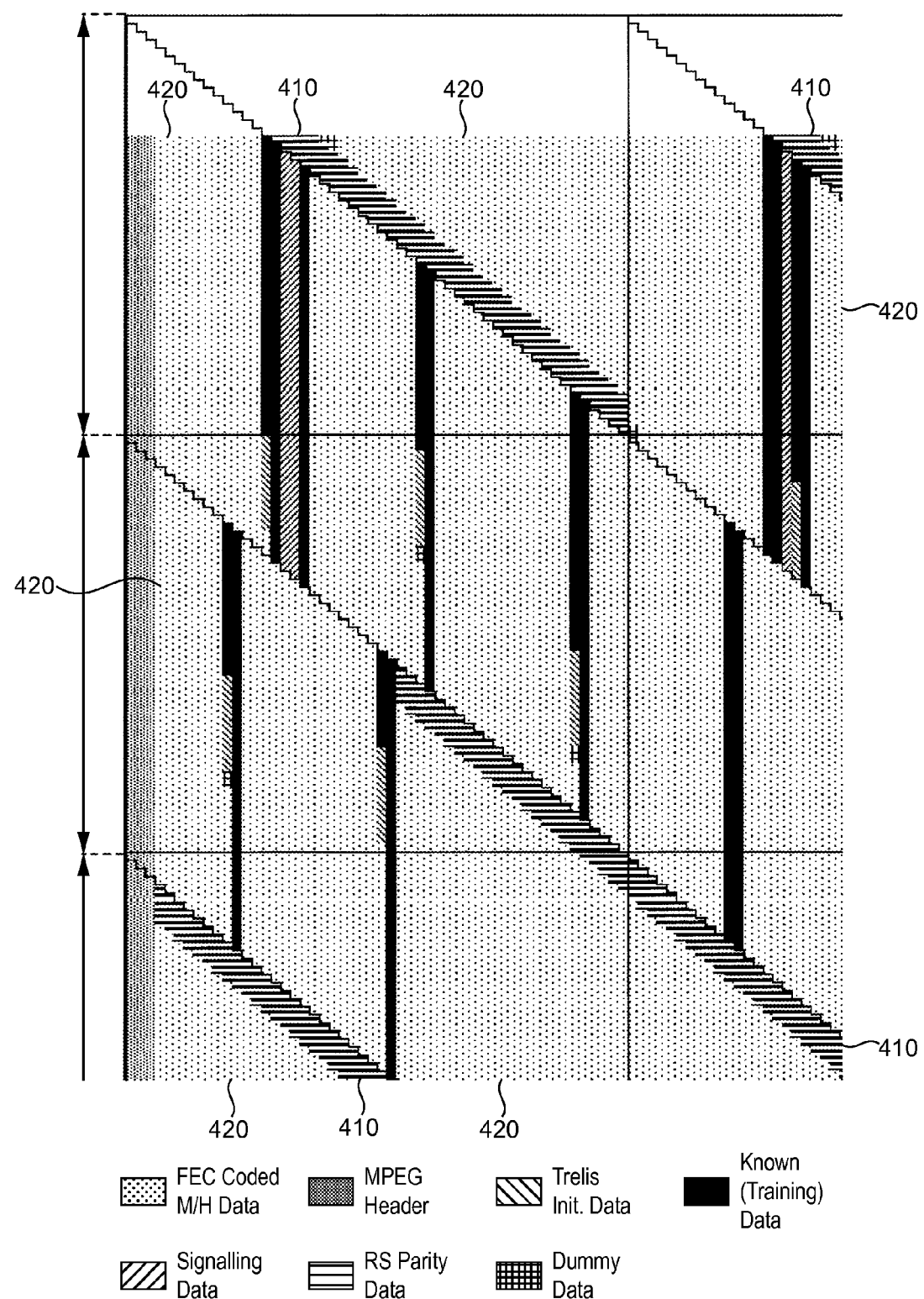
FIG. 4b is an expanded view of the exemplary transmission signal diagram illustrating the parity byte locations for the data packets according to the present disclosure.

Turning to FIG. 4a, a diagram showing an exemplary data transmission pattern map according to aspects of the present disclosure is shown. FIG. 4b shows an expanded view of 4a, for better visualization. The diagram shows the composition of the data packets within an M/H group as created within pre-processor 110 described in FIG. 1. The data transmission pattern shown in FIGS. 4a and 4b represent the data location pattern used as part of transmitting data according to the ATSC A153 or ATSC M/H standard. Data obtained from the non-systematic RS encoding process is located in pre-determined parity byte locations 410 within M/H data packets 420. As described above, the insertion of the new MH service data must also satisfy the RS decoding requirements of legacy ATSC receivers. These pre-determined locations for the parity bytes for the M/H data packets will be unique for each of the 118 segments of an M/H group and different from the locations of the parity bytes in an ATSC legacy or A/53 broadcast data packet (i.e. the last 20 bytes of the packet).

The following table shows the pre-determined parity byte locations of the pre-interleaved RS parity bytes in a packet for an M/H Group (118 packets), based on the data transmission pattern map described in FIGS. 4a and 4b and for the legacy ATSC, shown as the last line of the table. The byte locations are numbered 0 to 206, where 0 represents the first byte of the packet. For example, the first packet of the M/H group has RS parity bytes on byte locations 15, 16, 67, 68, 119, 120, 171 and 172, among others. In FIGS. 4a and 4b, these locations on the first horizontal line of the M/H Group are marked as legend 'RS parity data' and indicated as elements 410.

TABLE 1

ATSC-MH Group:

(15, 16, 17, 18, 19, 67, 68, 69, 70, 71, 119, 120, 121, 122, 123, 171, 172, 173, 174, 175)
(16, 17, 18, 19, 20, 68, 69, 70, 71, 72, 120, 121, 122, 123, 124, 172, 173, 174, 175, 176)
(17, 18, 19, 20, 21, 69, 70, 71, 72, 73, 121, 122, 123, 124, 125, 173, 174, 175, 176, 177)
(18, 19, 20, 21, 22, 70, 71, 72, 73, 74, 122, 123, 124, 125, 126, 174, 175, 176, 177, 178)
(19, 20, 21, 22, 23, 71, 72, 73, 74, 75, 123, 124, 125, 126, 127, 175, 176, 177, 178, 179)
(20, 21, 22, 23, 24, 72, 73, 74, 75, 76, 124, 125, 126, 127, 128, 176, 177, 178, 179, 180)
(21, 22, 23, 24, 25, 73, 74, 75, 76, 77, 125, 126, 127, 128, 129, 177, 178, 179, 180, 181)
(22, 23, 24, 25, 26, 74, 75, 76, 77, 78, 126, 127, 128, 129, 130, 178, 179, 180, 181, 182)
(23, 24, 25, 26, 27, 75, 76, 77, 78, 79, 127, 128, 129, 130, 131, 179, 180, 181, 182, 183)
(24, 25, 26, 27, 28, 76, 77, 78, 79, 80, 128, 129, 130, 131, 132, 180, 181, 182, 183, 184)
(25, 26, 27, 28, 29, 77, 78, 79, 80, 81, 129, 130, 131, 132, 133, 181, 182, 183, 184, 185)
(26, 27, 28, 29, 30, 78, 79, 80, 81, 82, 130, 131, 132, 133, 134, 182, 183, 184, 185, 186)
(27, 28, 29, 30, 31, 79, 80, 81, 82, 83, 131, 132, 133, 134, 135, 183, 184, 185, 186, 187)

TABLE 1-continued (28, 29, 30, 31, 32, 80, 81, 82, 83, 84, 132, 133, 134, 135, 136, 184, 185, 186, 187, 188)
(29, 30, 31, 32, 33, 81, 82, 83, 84, 85, 133, 134, 135, 136, 137, 185, 186, 187, 188, 189)
(30, 31, 32, 33, 34, 82, 83, 84, 85, 86, 134, 135, 136, 137, 138, 186, 187, 188, 189, 190)
(31, 32, 33, 34, 35, 83, 84, 85, 86, 87, 135, 136, 137, 138, 139, 187, 188, 189, 190, 191)
(32, 33, 34, 35, 36, 84, 85, 86, 87, 88, 136, 137, 138, 139, 140, 188, 189, 190, 191, 192)
(33, 34, 35, 36, 37, 85, 86, 87, 88, 89, 137, 138, 139, 140, 141, 189, 190, 191, 192, 193)
(34, 35, 36, 37, 38, 86, 87, 88, 89, 90, 138, 139, 140, 141, 142, 190, 191, 192, 193, 194)
(35, 36, 37, 38, 39, 87, 88, 89, 90, 91, 139, 140, 141, 142, 143, 191, 192, 193, 194, 195)
(36, 37, 38, 39, 40, 88, 89, 90, 91, 92, 140, 141, 142, 143, 144, 192, 193, 194, 195, 196)
(37, 38, 39, 40, 41, 89, 90, 91, 92, 93, 141, 142, 143, 144, 145, 193, 194, 195, 196, 197)
(38, 39, 40, 41, 42, 90, 91, 92, 93, 94, 142, 143, 144, 145, 146, 194, 195, 196, 197, 198)
(39, 40, 41, 42, 43, 91, 92, 93, 94, 95, 143, 144, 145, 146, 147, 195, 196, 197, 198, 199)
(40, 41, 42, 43, 44, 92, 93, 94, 95, 96, 144, 145, 146, 147, 148, 196, 197, 198, 199, 200)
(41, 42, 43, 44, 45, 93, 94, 95, 96, 97, 145, 146, 147, 148, 149, 197, 198, 199, 200, 201)
(42, 43, 44, 45, 46, 94, 95, 96, 97, 98, 146, 147, 148, 149, 150, 198, 199, 200, 201, 202)
(43, 44, 45, 46, 47, 95, 96, 97, 98, 99, 147, 148, 149, 150, 151, 199, 200, 201, 202, 203)
(44, 45, 46, 47, 48, 96, 97, 98, 99, 100, 148, 149, 150, 151, 152, 200, 201, 202, 203, 204)
(45, 46, 47, 48, 49, 97, 98, 99, 100, 101, 149, 150, 151, 152, 153, 201, 202, 203, 204, 205)
(46, 47, 48, 49, 50, 98, 99, 100, 101, 102, 150, 151, 152, 153, 154, 202, 203, 204, 205, 206)
(47, 48, 49, 50, 51, 99, 100, 101, 102, 103, 149, 151, 152, 153, 154, 155, 203, 204, 205, 206)
(48, 49, 50, 51, 100, 101, 102, 103, 145, 146, 147, 148, 149, 152, 153, 154, 155, 204, 205, 206)
(49, 50, 51, 101, 102, 103, 142, 143, 144, 145, 146, 147, 148, 149, 152, 153, 154, 155, 205, 206)
(50, 51, 102, 103, 139, 140, 141, 142, 143, 144, 145, 146, 147, 148, 149, 152, 153, 154, 155, 206)
(51, 103, 136, 137, 138, 139, 140, 141, 142, 143, 144, 145, 146, 147, 148, 149, 152, 153, 154, 155)
(132, 133, 136, 137, 138, 139, 140, 141, 142, 143, 144, 145, 146, 147, 148, 149, 152, 153, 154, 155)
(133, 136, 137, 138, 139, 140, 141, 142, 143, 144, 145, 146, 147, 148, 149, 152, 153, 154, 155, 156)
(136, 137, 138, 139, 140, 141, 142, 143, 144, 145, 146, 147, 148, 149, 152, 153, 154, 155, 156, 157)
(137, 138, 139, 140, 141, 142, 143, 144, 145, 146, 147, 148, 149, 152, 153, 154, 155, 156, 157, 158)
(138, 139, 140, 141, 142, 143, 144, 145, 146, 147, 148, 149, 152, 153, 154, 155, 156, 157, 158, 159)
(139, 140, 141, 142, 143, 144, 145, 146, 147, 148, 149, 152, 153, 154, 155, 156, 157, 158, 159, 160)
(140, 141, 142, 143, 144, 145, 146, 147, 148, 149, 152, 153, 154, 155, 156, 157, 158, 159, 160, 161)
(141, 142, 143, 144, 145, 146, 147, 148, 149, 152, 153, 154, 155, 156, 157, 158, 159, 160, 161, 162)
(142, 143, 144, 145, 146, 147, 148, 149, 152, 153, 154, 155, 156, 157, 158, 159, 160, 161, 162, 163)
(143, 144, 145, 146, 147, 148, 149, 152, 153, 154, 155, 156, 157, 158, 159, 160, 161, 162, 163, 164)
(144, 145, 146, 147, 148, 149, 152, 153, 154, 155, 156, 157, 158, 159, 160, 161, 162, 163, 164, 165)
(144, 145, 146, 147, 148, 149, 152, 153, 154, 155, 156, 157, 158, 159, 160, 161, 162, 163, 164, 165)
(145, 146, 147, 148, 149, 152, 153, 154, 155, 156, 157, 158, 159, 160, 161, 162, 163, 164, 165, 167)
(146, 147, 148, 149, 152, 153, 154, 155, 156, 157, 158, 159, 160, 161, 162, 163, 164, 165, 167, 168)
(147, 148, 149, 152, 153, 154, 155, 156, 157, 158, 159, 160, 161, 162, 163, 164, 165, 167, 168, 169)
(148, 149, 152, 153, 154, 155, 156, 157, 158, 159, 160, 161, 162, 163, 164, 165, 167, 168, 169, 170)
(149, 152, 153, 154, 155, 156, 157, 158, 159, 160, 161, 162, 163, 164, 165, 167, 168, 169, 170, 171)
(152, 153, 154, 155, 156, 157, 158, 159, 160, 161, 162, 163, 164, 165, 167, 168, 169, 170, 171, 172)
(153, 154, 155, 156, 157, 158, 159, 160, 161, 162, 163, 164, 165, 167, 168, 169, 170, 171, 172, 173)
(154, 155, 156, 157, 158, 159, 160, 161, 162, 163, 164, 165, 167, 168, 169, 170, 171, 172, 173, 174)
(155, 156, 157, 158, 159, 160, 161, 162, 163, 164, 165, 167, 168, 169, 170, 171, 172, 173, 174, 175)
(156, 157, 158, 159, 160, 161, 162, 163, 164, 165, 167, 168, 169, 170, 171, 172, 173, 174, 175, 176)
(157, 158, 159, 160, 161, 162, 163, 164, 165, 167, 168, 169, 170, 171, 172, 173, 174, 175, 176, 177)
(158, 159, 160, 161, 162, 163, 164, 165, 167, 168, 169, 170, 171, 172, 173, 174, 175, 176, 177, 178)

TABLE 1-continued (158, 159, 160, 161, 162, 163, 164, 165, 168, 169, 170, 171, 172, 173, 174, 175, 176, 177, 178, 179)
(159, 160, 161, 162, 163, 164, 165, 168, 169, 170, 171, 172, 173, 174, 175, 176, 177, 178, 179, 180)
(160, 161, 162, 163, 164, 165, 168, 169, 170, 171, 172, 173, 174, 175, 176, 177, 178, 179, 180, 181)
(160, 161, 162, 163, 164, 165, 168, 169, 170, 171, 172, 173, 174, 175, 176, 177, 178, 179, 180, 181)
(161, 162, 163, 164, 165, 168, 169, 170, 171, 172, 173, 174, 175, 176, 177, 178, 179, 180, 181, 183)
(28, 80, 132, 165, 168, 169, 170, 171, 172, 173, 174, 175, 176, 177, 178, 179, 180, 181, 183, 184)
(28, 29, 80, 81, 132, 133, 171, 172, 173, 174, 175, 176, 177, 178, 179, 180, 181, 183, 184, 185)
(28, 29, 30, 80, 81, 82, 132, 133, 134, 175, 176, 177, 178, 179, 180, 181, 183, 184, 185, 186)
(28, 29, 30, 31, 80, 81, 82, 83, 132, 133, 134, 135, 179, 180, 181, 183, 184, 185, 186, 187)
(28, 29, 30, 31, 32, 80, 81, 82, 83, 84, 132, 133, 134, 135, 136, 184, 185, 186, 187, 188)
(29, 30, 31, 32, 33, 81, 82, 83, 84, 85, 133, 134, 135, 136, 137, 185, 186, 187, 188, 189)
(30, 31, 32, 33, 34, 82, 83, 84, 85, 86, 134, 135, 136, 137, 138, 186, 187, 188, 189, 190)
(31, 32, 33, 34, 35, 83, 84, 85, 86, 87, 135, 136, 137, 138, 139, 187, 188, 189, 190, 191)
(32, 33, 34, 35, 36, 84, 85, 86, 87, 88, 136, 137, 138, 139, 140, 188, 189, 190, 191, 192)
(33, 34, 35, 36, 37, 85, 86, 87, 88, 89, 137, 138, 139, 140, 141, 189, 190, 191, 192, 193)
(34, 35, 36, 37, 38, 86, 87, 88, 89, 90, 138, 139, 140, 141, 142, 190, 191, 192, 193, 194)
(35, 36, 37, 38, 39, 87, 88, 89, 90, 91, 139, 140, 141, 142, 143, 191, 192, 193, 194, 195)
(36, 37, 38, 39, 40, 88, 89, 90, 91, 92, 140, 141, 142, 143, 144, 192, 193, 194, 195, 196)
(37, 38, 39, 40, 41, 89, 90, 91, 92, 93, 141, 142, 143, 144, 145, 193, 194, 195, 196, 197)
(38, 39, 40, 41, 42, 90, 91, 92, 93, 94, 142, 143, 144, 145, 146, 194, 195, 196, 197, 198)
(39, 40, 41, 42, 43, 91, 92, 93, 94, 95, 143, 144, 145, 146, 147, 195, 196, 197, 198, 199)
(40, 41, 42, 43, 44, 92, 93, 94, 95, 96, 144, 145, 146, 147, 148, 196, 197, 198, 199, 200)
(41, 42, 43, 44, 45, 93, 94, 95, 96, 97, 145, 146, 147, 148, 197, 198, 199, 200, 201)
(42, 43, 44, 45, 46, 94, 95, 96, 97, 98, 146, 147, 148, 149, 150, 198, 199, 200, 201, 202)
(43, 44, 45, 46, 47, 95, 96, 97, 98, 99, 147, 148, 149, 150, 151, 199, 200, 201, 202, 203)
(44, 45, 46, 47, 48, 96, 97, 98, 99, 100, 148, 149, 150, 151, 152, 200, 201, 202, 203, 204)
(45, 46, 47, 48, 49, 97, 98, 99, 100, 101, 149, 150, 151, 152, 153, 201, 202, 203, 204, 205)
(46, 47, 48, 49, 50, 98, 99, 100, 101, 102, 150, 151, 152, 153, 154, 202, 203, 204, 205, 206)
(47, 48, 49, 50, 51, 99, 100, 101, 102, 103, 151, 152, 153, 154, 155, 202, 203, 204, 205, 206)
(48, 49, 50, 51, 52, 100, 101, 102, 103, 104, 152, 153, 154, 155, 156, 202, 203, 204, 205, 206)
(49, 50, 51, 52, 53, 101, 102, 103, 104, 105, 153, 154, 155, 156, 157, 202, 203, 204, 205, 206)
(50, 51, 52, 53, 54, 102, 103, 104, 105, 106, 154, 155, 156, 157, 158, 202, 203, 204, 205, 206)
(3, 51, 52, 53, 54, 55, 103, 104, 105, 106, 107, 155, 156, 157, 158, 159, 203, 204, 205, 206)
(3, 4, 52, 53, 54, 55, 56, 104, 105, 106, 107, 108, 156, 157, 158, 159, 160, 204, 205, 206)
(3, 4, 5, 53, 54, 55, 56, 57, 105, 106, 107, 108, 109, 157, 158, 159, 160, 161, 205, 206)
(3, 4, 5, 6, 54, 55, 56, 57, 58, 106, 107, 108, 109, 110, 158, 159, 160, 161, 162, 206)
(3, 4, 5, 6, 7, 55, 56, 57, 58, 59, 107, 108, 109, 110, 111, 159, 160, 161, 162, 163)
(4, 5, 6, 7, 8, 56, 57, 58, 59, 60, 108, 109, 110, 111, 112, 160, 161, 162, 163, 164)
(5, 6, 7, 8, 9, 57, 58, 59, 60, 61, 109, 110, 111, 112, 113, 161, 162, 163, 164, 165)
(6, 7, 8, 9, 10, 58, 59, 60, 61, 62, 110, 111, 112, 113, 114, 162, 163, 164, 165, 166)
(7, 8, 9, 10, 11, 59, 60, 61, 62, 63, 111, 112, 113, 114, 115, 163, 164, 165, 166, 167)
(8, 9, 10, 11, 12, 60, 61, 62, 63, 64, 112, 113, 114, 115, 116, 164, 165, 166, 167, 168)
(9, 10, 11, 12, 13, 61, 62, 63, 64, 65, 113, 114, 115, 116, 117, 165, 166, 167, 168, 169)
(10, 11, 12, 13, 14, 62, 63, 64, 65, 66, 114, 115, 116, 117, 118, 166, 167, 168, 169, 170)
(11, 12, 13, 14, 15, 63, 64, 65, 66, 67, 115, 116, 117, 118, 119, 167, 168, 169, 170, 171)
(12, 13, 14, 15, 16, 64, 65, 66, 67, 68, 116, 117, 118, 119, 120, 168, 169, 170, 171, 172)
(13, 14, 15, 16, 17, 65, 66, 67, 68, 69, 117, 118, 119, 120, 121, 169, 170, 171, 172, 173)
(14, 15, 16, 17, 18, 66, 67, 68, 69, 70, 118, 119, 120, 121, 122, 170, 171, 172, 173, 174)
(15, 16, 17, 18, 19, 67, 68, 69, 70, 71, 119, 120, 121, 122, 123, 171, 172, 173, 174, 175)
(16, 17, 18, 19, 20, 68, 69, 70, 71, 72, 120, 121, 122, 123, 124, 172, 173, 174, 175, 176)
(17, 18, 19, 20, 21, 69, 70, 71, 72, 73, 121, 122, 123, 124, 125, 173, 174, 175, 176, 177)
(18, 19, 20, 21, 22, 70, 71, 72, 73, 74, 122, 123, 124, 125, 126, 174, 175, 176, 177, 178)
(19, 20, 21, 22, 23, 71, 72, 73, 74, 75, 123, 124, 125, 126, 127, 175, 176, 177, 178, 179)
(20, 21, 22, 23, 24, 72, 73, 74, 75, 76, 124, 125, 126, 127, 128, 176, 177, 178, 179, 180)
(21, 22, 23, 24, 25, 73, 74, 75, 76, 77, 125, 126, 127, 128, 129, 177, 178, 179, 180, 181)
(22, 23, 24, 25, 26, 74, 75, 76, 77, 78, 126, 127, 128, 129, 130, 178, 179, 180, 181, 182)
(23, 24, 25, 26, 27, 75, 76, 77, 78, 79, 127, 128, 129, 130, 131, 179, 180, 181, 182, 183)

TABLE 1-continued

Legacy ATSC encoder:

(187, 188, 189, 190, 191, 192, 193, 194, 195, 196, 197, 198, 199, 200, 201, 202, 203, 204, 205, 206)

It is important to note that applying a signal encoder, such as signal encoder 300, to a signal data structure having a data transmission map such as that shown in FIGS. 4a and 4b may involve signal encoder 300 receiving an entire packet of 207 bytes for which 20 of the bytes may be erasures, based on the data positions indicated in the table above. By applying an RS decoder with erasures to the packet, the remaining 20 bytes will be calculated in the pre-determined erasure locations, since this is the maximum number of erasures that such RS decoder can decode.

Figure 5:
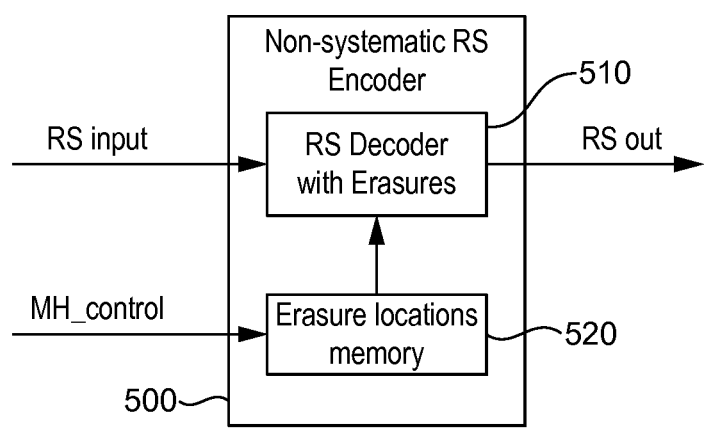
FIG. 5 is a block diagram of another embodiment of a signal encoder according to the present disclosure.

Turning to FIG. 5, a block diagram of another embodiment of a signal encoder 500 according to aspects of the present disclosure is shown. Signal encoder 500 operates in a similar manner as described for signal encoder 300 in FIG. 3 as well as systematic/non-systematic RS encoder 154 in FIG. 1. Signal encoder 500 uses a single encoder, implemented as a RS decoder with erasures, for all packets, including main service, or ATSC legacy, data and the MH service data.

In signal encoder 500, the input signal is provided to RS decoder with erasures 510. RS decoder with erasures 510 provides the encoded output signal for further processing. A control signal, MH_control, is provided to erasure location map memory 520. Erasure location map memory 520 is connected to RS decoder with erasures 510.

In operation, MH_control includes a counter signal that identifies address locations in erasure location map memory 520. Each address location corresponds to a row in the table shown above. The counter signal is indexed to and the memory is mapped to, values ranging from 0 to 118, representing each of the rows in the table. As a result, during the main service data or legacy ATSC data portion, MH_control=118, and during MH service data portion, MH_control will sequentially assume the values 0 to 117 associated with each of the 118 MH packets of an MH group.

It is important to note that since the erasure locations are only as specified by the data transmission pattern described in FIGS. 4a and 4b and the table presented above, and also that the number of erasures will always equal 20, further simplifications of the design of an RS decoder with erasures, such as the RS decoder with erasures described in FIG. 5 may be made. These simplifications will be described in further detail below.

Figure 6:
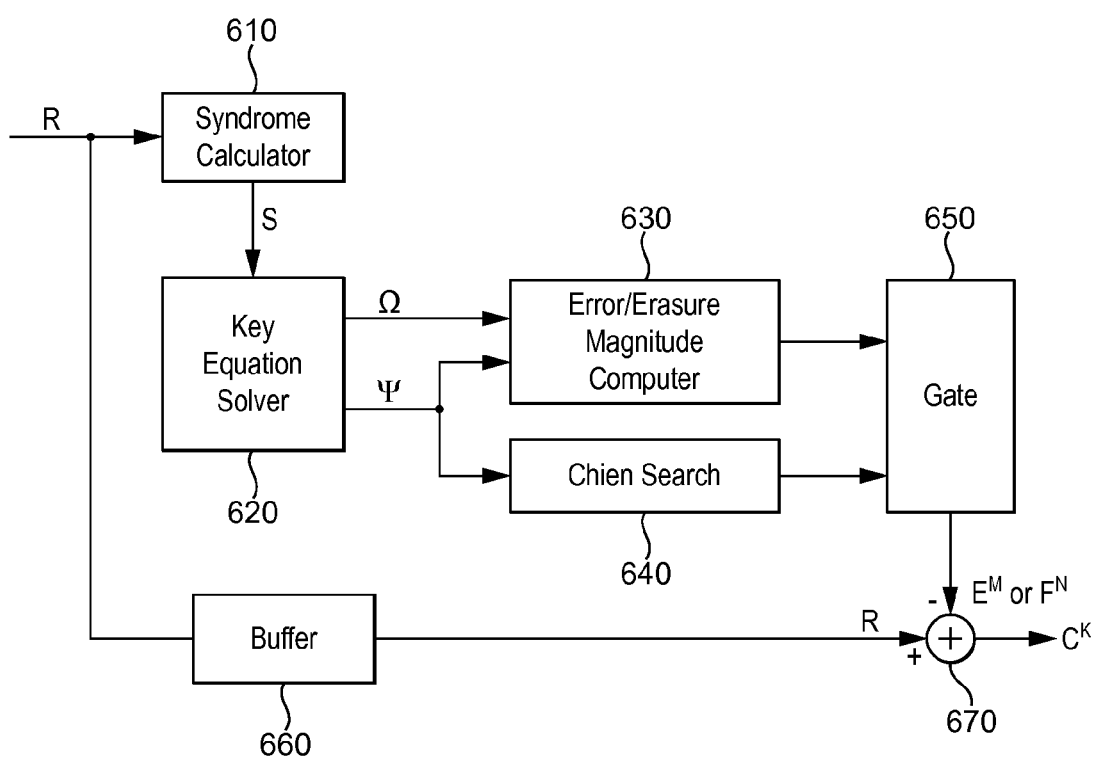
FIG. 6 is a block diagram of an embodiment of a Reed Solomon Decoder according to the present disclosure.

Turning now to FIG. 6, a block diagram illustrating an embodiment of a RS decoder with erasures 600 used in a signal encoding circuit according to aspects of the present disclosure is shown. RS decoder with erasures 600 represents an implementation of the Euclid's algorithm for RS decoding error and erasures. RS decoder with erasures 600 may operate in a manner similar to that described for RS decoder with erasures 510 described in FIG. 5.

In RS decoder with erasures 600, the input signal from a previous processing block, normally representing a codeword, for instance a 207-byte packet, containing one or more errors or erasures is provided to syndrome calculator 610. Syndrome calculator 610 is connected to key equation solver 620. A first output of key equation solver 620 is connected to error/erasure magnitude computer 630. A second different output of key equation solver is also connected error/erasure magnitude computer as well as being connected to Chien search block 640. Outputs of both the error/erasure magnitude computer 630 and Chien search block 640 are connected to gate 650. The input signal is also provided to buffer 660. Buffer 660 is connected to the positive input of summer 670. The output of gate 650 is connected to the negative input of summer 670. The output of summer 670 represents the output codeword, after correction or removal of the errors, of the RS decoder with erasures 600.

In operation of RS decoder with erasures 600, a received code word may be described by the following polynomial:

$$R(X) = \sum_{i=0}^{N-1} R_i * X^i = \sum_{i=0}^{N-1} (C_i + E_i) * X^i \quad (2)$$

where $R_i$ are the received symbols and the most significant symbol has the highest order; $C_i$ are the code word or transmitted symbols; $E_i$ are the equivalent error/erasure symbols resulting from additive channel noise and the operations of addition and multiplication are performed on the GF(256).

Syndrome calculator 610 computes a syndrome polynomial $S(x)$ for the received codeword, defined by:

$$S(X) = \sum_{j=0}^{2*t-1} S_j * X^j \quad (3)$$

where each component $S_j$ is given by:

$$S_j = R(\alpha^j) = \sum_{i=0}^{N-1} R_i * (\alpha^j)^i \quad (4)$$

where $\alpha^j$ is a Galois field GF(q) element. It is important to note that if the syndrome calculated in (4) is all zero, then stop the algorithm and send the received code word R(X) to the RS decoder output. In other words, if there is no error/erasure, that is, $E_i=0$, for $0 \le i < N$, then $S_j=0$, far $0 \le j < 2*t$ and the received code word is the decoded code word.

Key equation solver 620 performs several computations to process and determine the error/erasure locations and magnitudes in the received codeword. Key equation solver 620 computes the erasure polynomial $\Gamma(X)$ using the erasure information provided by the receiver, as follows:

$$\Gamma(X) = \prod_{l=0}^{f-1} (1 - Y_l * X) \quad (5)$$

where $Y_l = \alpha^{j(l)}$ is an erasure locator; j(l) is an erasure coordinate in the code word, $0 \le l < f$ and f is the number of erasures. It is important to note that, in many cases, an additional error detector, not shown, may be added as part of a decoding process and the error detector may identify possible erasure locations in the codeword.

Key equation solver 620 also determines Forney's modified syndrome polynomial T(X) using the output of syndrome calculator 610 (equations 3 and 4) and the computed erasure polynomial (equation 5) and given by:

$$T(X)=S(X)*\Gamma(X) \bmod X^{2*t} \qquad (6)$$

where mod means the modulo operation.

Based on the above computations, key equation solver 620 solves the key equation defined by:

$$T(X)*\Lambda(X)=\Omega(X) \bmod X^{2*t} \qquad (7)$$

where $\Lambda(X)$ is the error locator polynomial and $\Omega(X)$ is the error magnitude polynomial.

The error locator polynomial, $\Lambda(X)$, similar to equation (5) is given by:

$$\Lambda(X) = \prod_{k=0}^{v-1} (1 - X_k * X) \qquad (8)$$

where $X_k=\alpha^{i(k)}$ is an error locator; i(k) is an error coordinate in the code word, $0 \leq k < v$ and v is the number of errors.

The error magnitude polynomial, $\Omega(X)$, is given by:

$$\Omega(X)=1+\Omega_2*X^2+\Omega_4*X^4+\ldots+\Omega_{2*t}*X^{2*t} \qquad (9)$$

where the odd indexed coefficients are always zero.

Key equation solver 620 operates iteratively to solve equation (7) and find equations (8) and (9), based on the Euclid algorithm. The Euclid algorithm proceeds as below:

Set $g_{-1}(X)=0, g_0(X)=\Gamma(X), r_{-1}(X)=X^{2*t}$ and $r_o(X)=T(X)$.

Perform the following recursion:

$$r_i(X)=r_{i-2}(X)-q_i(X)r_{i-1}(X) \qquad (10)$$

$$g_i(X)=g_{i-2}(X)-q_i(X)g_{i-1}(X) \qquad (11)$$

The recursion stops when $r<t+e/2$ for e even or $r<t+(e-1)/2$ for e odd, where $r=\deg[r_n(X)]$ and $e=\deg[\Gamma(X)]$.

Once the recursion is complete, equation solver 620 sets the error/erasure locator polynomial, $\Psi(X)=\Gamma(X)\Lambda(X)=g_n(X)$ and the error magnitude polynomial, $\Omega(X)=r_n(X)$ and outputs each polynomial.

Chien search block 640 performs a search based on the Chien search algorithm. The Chien search algorithm operates on the error/erasure locator polynomial $\Psi(X)$ to find the error locations, since the erasure locations may be estimated by, for instance, by an error detection device and are already known or estimated by the detection device. However, using a RS decoder with erasures for encoding a signal may not require the use of an error detection device because the error locations may be inherently known, as described herein. In general, the search algorithm corresponds to finding the inverse of the roots of the polynomial and identifying the error coordinates in the code word, i(k), for $0 \leq k < v$ and v being the number of errors, as in equation (8).

The error/erasure magnitude computer 630 calculates the error magnitudes by using the following equation:

$$E_{i(k)} = \frac{-X_k * \Omega(X_k^{-1})}{\Psi'(X_k^{-1})} \qquad (12)$$

where $0 \leq k < v$, v is the number of errors and $\Psi(X)$ is the derivative of the error/erasure locator polynomial.

The error/erasure magnitude computer 630 also calculates the erasure magnitudes by using the following equation:

$$F_{j(l)} = \frac{-Y_l * \Omega(Y_l^{-1})}{\Psi'(Y_l^{-1})} \qquad (13)$$

$0 \leq l < f$, f is the number of erasures and $\Psi'(X)$ is the derivative of the error/erasure locator polynomial.

Buffer 660 stores and delays the received code word in order to account for processing and computation delays incurred in syndrome calculator 610, error/erasure magnitude computer 630, and Chien search block 640. Gate unit 650 outputs the estimated error E* or erasure F* magnitude for each root found (i.e. error location) in Chien search block 640.

Summer 670 subtract the error or erasure magnitudes from the received code word at the appropriate coordinates or locations in the code word to obtain the estimated code word C* satisfying equation (2). The output of RS decoder with erasures 600 is C*, the estimated code word.

As described above, the application of a RS decoder, such as RS decoder with erasures 600, may be used in place of an encoder in a signal transmission system. However, it is important to note that the use of an RS decoder with erasures in place of a systematic/non-systematic RS encoder, such as systematic/non-systematic encoder 154 described in FIG. 1 may allow further simplification to the Euclid Algorithm and to the blocks described for RS decoder with erasures 600 in FIG. 6. For example, in the input signal to the encoder there are no errors; only erasures and the number of erasures is 20, corresponding to the number of parity bytes that need to be calculated. Since the existence of the erasures as well as their locations are known, based on the table above, and only by extreme coincidence, the syndrome will be all zero, the syndrome calculation will always result in a non-zero output. The input signal may include a known or predetermined value at each of the erasure locations (i.e. parity byte locations) identified in the table above.

Further, the computation of the erasure polynomial, $\Gamma(X)$ of equation (5) in key equation solver 620 should not be necessary. The computation is not necessary because only 119 possibilities of erasure patterns exist. Therefore, there is no need to compute the erasure polynomial on the fly. Instead, the 119 possibilities may be pre-computed and stored in a memory. Also, in equation (5), the number of erasures f=20 is a constant. Therefore, all the polynomials will have degree f=20 and f+1=21 coefficients, of which the first coefficient is equal to 1 and each coefficient being an RS symbol, that is, 8 bits. These pre-computed polynomials can then be stored in a ROM that will contain 20*8*119 bits, since the first coefficient is already known. The pre-computation represents a decrease in latency and logic in exchange for memory.

Still further, solving the key equation (7) may be greatly simplified based on the realization that: $r=\deg[r_0(X)]=T(X)]<2*t$, from the definition in eq. (6) and $e=\deg[\Gamma(X)]=2*t$. As a result, $r<t+e/2$ and the algorithm may be stopped, eliminating the recursive portion of the algorithm, which is the logic intensive. The algorithm may directly set $\Psi(X)=g_0(X)=\Gamma(X)$ and $\Omega(X)=r_0(X)=T(X)$. As a result, the processing in key equation solver 620 may be significantly reduced.

In addition, the Chien search block 640 may be eliminated, since there are no errors and the erasure locations are already known. Also, the calculation of the error magnitude in error/erasure magnitude computer 630 may be eliminated, since there are no actual errors, only error locations with temporary or initial values, in the data signal.

Finally, the calculation of the erasure magnitude in error/erasure magnitude computer 630 may also be greatly simplified based on rewriting eq. (13) as:

$$F_{j(l)} = \frac{-\Omega(Y_l^{-1})}{Y_l^{-1} * \Psi'(Y_l^{-1})} = -D_l^{-1} * \Omega(Y_l^{-1}) \quad (14)$$

For $0 \le l < f$, where f is the number of erasures and $\Psi(X)$ is the derivative of the error/erasure locator polynomial. It is well known to those skilled in the art that when using codes defined over a field of characteristic 2, the polynomial coefficients of the odd powers of polynomial X disappear resulting in:

$$D(X) = X * \Psi'(X) = \Gamma_1 * X + \Gamma_3 * X^3 + \Gamma_5 * X^5 + \quad (15)$$

Equation (15) implies that the denominator in equation (14) can be defined by:

$$D_l = D(X)|_{X=Y_l^{-1}} \quad (16)$$

$X = Y_l^{-1}$, where $Y_l = \alpha^{j(l)}$ is an erasure locator; j(l) is an erasure coordinate in the code word, $0 \le l < f$ and $f=20$ is the number of erasures.

Since all the erasure locators and $\Gamma(X)$ are pre-determined based on the signal data pattern described in FIG. 4, the values of $D_l^{-1}$ for each row of the table may be pre-calculated or pre-determined and stored in a ROM that will contain 20*8*119 bits. It also eliminates the need for an inverse operation, since the value of $D_l^{-1}$ is already being calculated. The above recognized simplification further represents a decrease in latency and logic in exchange for memory.

Figure 7:
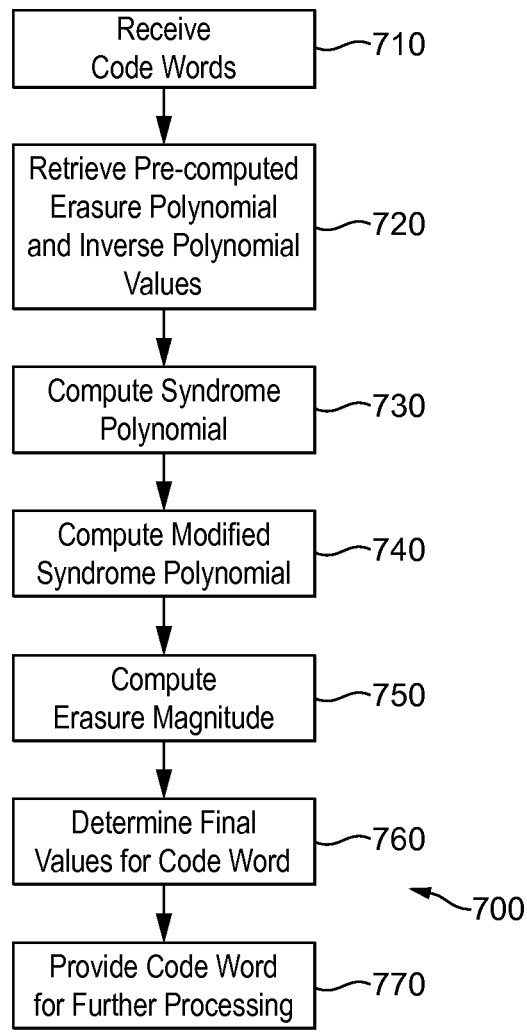
FIG. 7 is a flow chart of an embodiment of a process for encoding a signal according to the present disclosure.

Turning to FIG. 7, a flow chart of an embodiment of a signal encoding process according to aspects of the present disclosure is shown. For purposes of example and explanation, the steps of process 700 may primarily be used in systematic/non-systematic RS encoder 154 in FIG. 1. The steps of process 700 may also be carried out by a signal encoder, such as signal encoder 500 in FIG. 5. The steps of process 700 are exemplary only, and are not intended to limit the present disclosure in any manner.

At step 710, input codewords are received. The input codewords may be grouped into packets. In one embodiment, the codewords are arranged in packets containing 207 bytes, of which 187 bytes represent data. The codewords may be part of more than one possible stream of data, such as an ATSC main service data stream or an ATSC MH service stream. Also, at step 710, one or more control signals may be received. The one or more control signals may be used to identify the codewords as well as specific characteristics of the codewords. Some of the characteristics for the codewords may be the type of data in the codeword or the format of the data in the codewords, and may include other characteristics used for identifying the codewords. In one embodiment, the control signal represents an address location in a memory. The address location in memory contains identification information for the location of the parity bytes within the received codeword.

Next, at step 720, based on the information received at step 710, the pre-computed polynomials used for the erasure polynomial $\Gamma(X)$ and inverse polynomial $D_l^{-1}$ in a modified Euclid algorithm are retrieved from a memory. The erasure polynomial $\Gamma(X)$ may be computed in a manner as described in equation (5) and stored in memory. The inverse polynomial $D_l^{-1}$ may similarly be pre-computed in a manner as described in equations (15) and (16) and stored in memory. As a result, the erasure polynomials and inverse polynomials for all possible codeword groups (i.e. the M/H groups and the legacy group) are known prior to the computations used in Euclid's algorithm performed during the encoding process. The information related to the location of the parity bytes in the codeword determines which one of the erasure polynomials and inverse polynomials is retrieved. In one embodiment, the erasure polynomial and inverse polynomial may be stored as part of an erasure set for each of the possible codeword groups for the M/H data packets and for the legacy data packets. The erasure set also includes the parity byte mapping, such as the mapping described in FIGS. 4a and 4b and the table above.

Also, at step 720, parity byte placeholders may be added to the received codewords. These placeholders may be added in the known locations for the parity bytes, or may be appended to the codewords in order to establish the correct codeword length. In one embodiment, the parity byte locations are retrieved from memory and the parity byte is given a temporary or initializing value, such as the value "0".

At step 730, for each received codeword, the syndrome polynomial S(x) is calculated. The syndrome polynomial S(x) is computed in a manner similar as described in equation (3). Next, at step 740, the Forney's modified syndrome polynomial T(X) is computed. Forney's modified syndrome polynomial T(X) is computed in a manner similar as described in equation (6). The computation will correspond to the error magnitude polynomial, that is, $\Omega(X) = T(X)$.

Next, at step 750, the erasure magnitudes are computed as in equation (14) using the inverse matrix value $D_l^{-1}$ retrieved at step 720. It is important to note that the erasure locations, although not always the same for each codeword, are known, based on the properties of the received codeword. In one embodiment, the properties associated with the codewords transmitted using the ATSC A/153 broadcast standard are used to identify sets of the erasure locations for each of the codewords. Information regarding the erasure locations may be provided with the codeword, such as through a control signal, and the erasure locations may be retrieved at step 720 or at step 750 as part of the erasure magnitude computation.

Next, at step 760, the computed erasure magnitudes are subtracted from the received code word at the appropriate coordinates or locations to obtain the corrected code word C* satisfying equation (2). At step 770, the corrected codeword C* is provided, as part of either a main service data stream (i.e. ATSC legacy data) or an MH service data stream for additional processing.

It is important to note that the steps described in process 700 represent a modification of the Euclid algorithm for an RS decoder with erasures described earlier. The modifications include changes made to accommodate operating conditions found in the encoding and transmitting of signals in accordance with the ATSC A153 broadcast standard known as ATSC M/H. For instance, several steps of the Euclid algorithm used with RS decoder with erasures 600 described in FIG. 6 may be eliminated or simplified by pre-computed values stored in memory, resulting in savings in logic and latency in exchange for relatively small size of memory.

Figure 8:
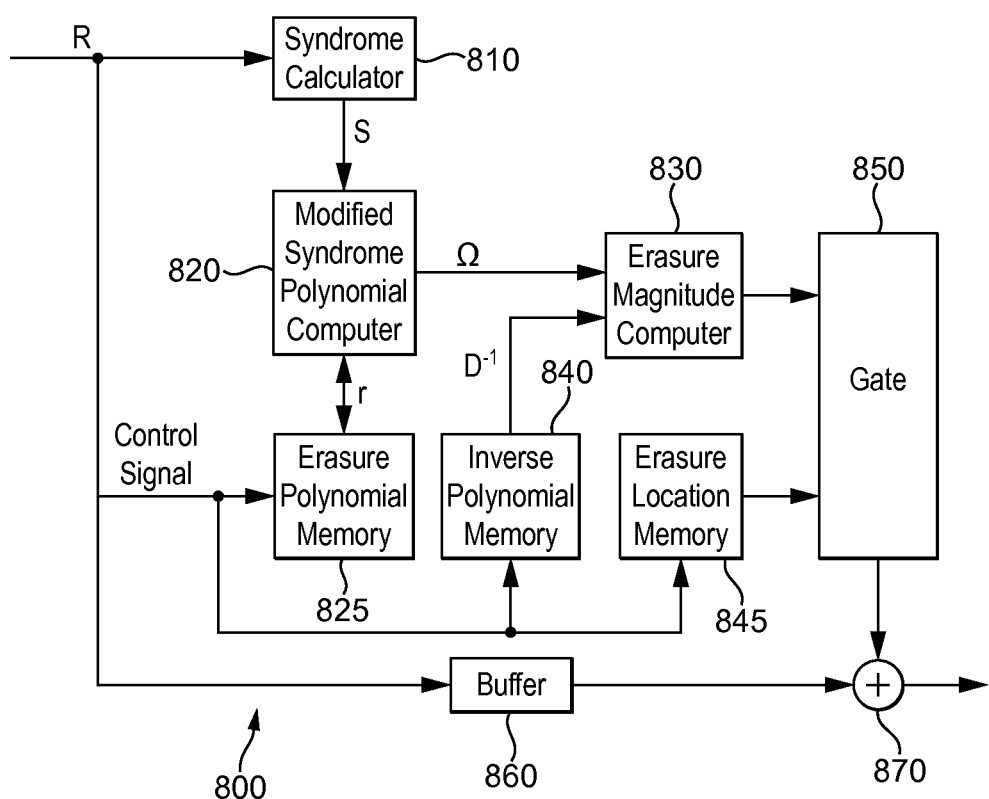
FIG. 8 is a block diagram of another embodiment of a Reed Solomon Decoder according to the present disclosure.

Turning now to FIG. 8, a block diagram of another embodiment of a RS decoder with erasures 800 according to certain aspects of the present disclosure is shown. RS decoder with erasures 800 implements an encoding algorithm based on Euclid's algorithm and also takes into account certain aspects associated with identifying multiple sets of predetermined locations for the erasures within the data, such as is used in the ATSC M/H broadcast standard. RS decoder with erasures 800 may operate in a manner similar to that described for RS decoder with erasures 510 described in FIG. 5 and may also implement the signal encoding process 700 described in FIG. 7.

The input signal, representing a codeword, is provided to syndrome calculator 810. Syndrome calculator 810 is connected to modified syndrome polynomial computer 820. Modified syndrome polynomial computer 820 is connected to erasure magnitude computer 830. Erasure magnitude computer 830 is connected to gate 850. A control signal, provided from an earlier processing block, is connected to erasure polynomial memory 825, inverse polynomial memory 840, and erasure location memory 845. Erasure polynomial memory 825 is connected to modified syndrome polynomial computer 820. Inverse polynomial memory 840 is connected to erasure magnitude computer 830. Erasure location memory 845 is connected to gate 850. Gate 850 is connected to one input of summer 870. The input signal is also provided to buffer 860, which is then connected to the second input of summer 870. The output of summer 870 is the output signal for RS decoder with erasures 800.

The functions and operation of syndrome calculator 810, erasure magnitude calculator 830, gate 850, buffer 860, and summer 870 are similar to the operations of the similarly named and numbered blocks in RS decoder with erasures 600 described in FIG. 6. Except as indicated below, these blocks will not be described in further detail here. Additionally, erasure polynomial memory 825, inverse polynomial memory 840, and erasure location memory 845 may be implemented as a single memory device and may also be included as part of erasure locations memory 520 described in FIG. 5.

In RS decoder with erasures 800, the received data does not contain errors. The received data may also include additional locations or parity byte placeholders for the parity bytes that will be calculated and added to the received data. In some embodiments that do not provide data packets with the additional locations or parity byte placeholders included, syndrome calculator 810 may include a circuit for inserting bytes into the received data packets. In one embodiment, parity bytes each having an initial or temporary value, such as the value "0", may be added at specific locations with the data packet based on the table described earlier in FIGS. 4a and 4b and in conjunction with the ATSC A/153 broadcast standard.

As described earlier, modified syndrome polynomial computer 820 includes functions to implement Euclid's algorithm in a simplified manner based on the sets of identified erasure locations within the codewords. Although aspects of the computations may be different for each codeword, the number of sets of erasure locations is known and the erasure locations may be identified based on characteristics of the data structure, as described in FIGS. 4a and 4b. Specifically, modified syndrome polynomial computer 820 determines values for Forney's modified syndrome polynomial T(X) based on equation (6). The value $\Gamma(X)$ is retrieved from erasure polynomial memory 825 and used in the computation. Modified syndrome polynomial computer 820 provides only an output value $\Omega(X)$. No additional computation associated with error or erasure locations is necessary.

The output from modified syndrome polynomial computer 820 is provided to erasure magnitude computer 830. Erasure magnitude computer 830 also retrieves the inverse polynomial $D_I^{-1}$ from inverse polynomial memory 840 and uses the values in determining the erasure magnitude values. In a similar manner, gate 850 retrieves the erasure locations from erasure location memory 845 in order to match up, or synchronize, the locations with the computed erasure magnitude values. As described earlier, summer 870 subtracts the erasure magnitude values at the identified erasure locations from the input codeword and provides the new codeword, as RS encoded codeword, as an output.

It is important to note that the values stored in memory for $\Gamma(X)$, $D_I^{-1}$, and the erasure locations are generally determined before the processing of the received codewords. For example, the values may be computed at the time of manufacture, external to the signal transmitting device, and programmed into the memory. Alternatively, the values may be computed by the signal transmitting device at a time prior to the processing of codewords, such as at initial device startup. The computations may be performed by modified syndrome polynomial computer 820, or may be performed by another processor within the device and stored in the memory.

It is to be appreciated that any memory used for storage of pre-computed or pre-determined values may be any conventional storage or memory device known in the art. Further, the implementation of the storage or memory may include several possible embodiments, such as a single memory device or, alternatively, more than one memory circuit connected together to form a shared or common memory. Still further, the memory may be included with other circuitry, such as portions of bus communications circuitry, in a larger circuit. Finally, the storage or memory may utilize any current storage technology suitable for storing data and/or instruction code including, but not limited to, static random access memory (SRAM), read only memory (ROM), and hard disk drive.

The present embodiments show a method and apparatus for encoding a signal based Reed-Solomon encoding. One or more of the embodiments implement the encoding operation by including an RS decoder with erasures and takes advantage of the ATSC M/H group structure to simplify its design. The concepts used in this disclosure may be extended to other systems, including Wi-Fi as well as other terrestrial satellite and wired communications systems. The embodiments may be implemented in VHDL, hardware, software, or any combination and may be utilized in a mobile ATSC-M/H transmitter device.

While the embodiments may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents and alternatives falling within the scope of the disclosure as defined by the following appended claims.

What is claimed is:

1. A method for encoding a signal, comprising the steps of:
   receiving a packet of data;
   determining a location for a parity byte in the packet of data, the location based on receiving a signal identifying a type of data for the packet of data as one of legacy broadcast data and mobile broadcast data;
   encoding the packet of data generate the parity byte;
   inserting the parity byte in the determined location for the parity byte in the packet of data; and
   outputting the encoded packet of data including the packet of data and the decoded parity byte,
   wherein the location of the parity byte in the packet of data identified as legacy broadcast data is different than the location of the parity byte in the packet of data identified as mobile broadcast data.

2. The method of claim 1, wherein the parity byte is initialized to a known value prior to encoding.

3. The method of claim 1, wherein the step of determining includes identifying an erasure set from a set of erasure sets, the erasure set associated with the location for the parity byte.

4. The method of claim 3 wherein each erasure set in the set of erasure sets includes at least one of a location identifier for parity bytes, an erasure polynomial, and an inverse polynomial.

5. The method of claim 1, wherein the step of encoding includes calculating a syndrome for the coded packet of data.

6. The method of claim 5, wherein the step of deencoding the data includes calculating a modified syndrome using the calculated syndrome and a known erasure polynomial.

7. The method of claim 6 wherein the step of encoding includes computing an erasure value for the parity byte based on the modified syndrome and a known inverse polynomial.

8. An apparatus for encoding a signal, comprising:
   means for receiving a signal, the signal containing a packet of data and an identifying signal, the identifying signal identifying a type of data for the packet of data as one of legacy broadcast data and mobile broadcast data;
   means for identifying a location for a parity byte in a packet of data, the location based on a characteristic of the packet of data;
   means for encoding the packet of data to generate the parity byte, the means for encoding also including a means for inserting the parity byte in the identified location for the parity byte in the packet of data; and
   means for outputting the encoded packet of data including the packet of data and the parity byte,
   wherein the location of the parity byte in the packet of data identified as legacy broadcast data is different than the location of the parity byte in the packet of data identified as mobile broadcast data.

9. The apparatus of claim 8, wherein the means for encoding initializes the parity byte to a known value.

10. The apparatus of claim 8, wherein the means for identifying includes means for identifying an erasure set from a set of erasure sets, the erasure set associated with the location for the parity byte.

11. The apparatus of claim 10 wherein each erasure set in the set of erasure sets includes at least one of a location identifier for parity bytes, an erasure polynomial, and an inverse polynomial.

12. The apparatus of claim 8, wherein the means for encoding includes means for calculating a syndrome for the packet of data.

13. The apparatus of claim 12, wherein the means for encoding includes means for calculating a modified syndrome using the calculated syndrome and a known erasure polynomial.

14. The apparatus of claim 13, wherein the means for encoding includes means for computing an erasure value for the parity byte based on the modified syndrome and a known inverse polynomial.

15. An apparatus for encoding a signal, comprising:
   an encoding block that receives a signal, the signal containing a packet of data and an identifying signal, the identifying signal identifying a type of data for the packet of data as one of legacy broadcast data and mobile broadcast data; and
   a memory block coupled to the encoding block, the memory block identifying a location for a parity byte in a packet of data, the location based on the identifying signal, the location of the parity byte in the packet of data identified as legacy broadcast data being different than the location of the parity byte in the packet of data identified as mobile broadcast data,
   wherein the encoding block encodes the packet of data to generate the parity byte and inserts the parity byte in the identified location for the parity byte in the packet of data.

* * * * *